United States Patent [19]

Toffetti

[11] Patent Number: 5,313,546
[45] Date of Patent: May 17, 1994

[54] HERMETICALLY SEALED JOINT COVER FOR FIBRE OPTIC CABLES

[75] Inventor: Eugenio Toffetti, Milan, Italy

[73] Assignee: Sirti, S.p.A., Milan, Italy

[21] Appl. No.: 978,358

[22] Filed: Nov. 18, 1992

[51] Int. Cl.$^5$ ................................................. G02B 7/00
[52] U.S. Cl. .................................... 385/135; 385/137; 385/94; 174/65 R
[58] Field of Search ................. 385/135, 137, 138, 94; 174/50, 65 R; 439/271, 519, 523, 587

[56] References Cited

U.S. PATENT DOCUMENTS

| | | | |
|---|---|---|---|
| 4,722,696 | 2/1988 | Ballhause | 439/275 |
| 5,109,467 | 4/1992 | Hogan et al. | 385/135 |
| 5,216,203 | 6/1993 | Gower | 174/65 R |

FOREIGN PATENT DOCUMENTS

0265725A1 12/1990 European Pat. Off.
WO8910021 10/1989 PCT Int'l Appl.
2209410A 5/1989 United Kingdom.
2239136A 6/1991 United Kingdom.

OTHER PUBLICATIONS

United Kingdom Search Report, 5 Feb., 1993, Examiner Price M. J.

Primary Examiner—John D. Lee
Assistant Examiner—Phan T. Heartney
Attorney, Agent, or Firm—Hedman, Gibson & Costigan

[57] ABSTRACT

An hermetically sealed joint cover for fibre optic cables which does not require the use of mastic and/or miscellaneous sealants, the hermetic seal being achieved by a seal gasket which is provided with at least one through hole partly open outwards and embracing each cable or series of cables entering and/or leaving the joint cover, and which is insertable into seats formed in apertures for the entry and exit of the cables into and from the joint cover.

5 Claims, 4 Drawing Sheets

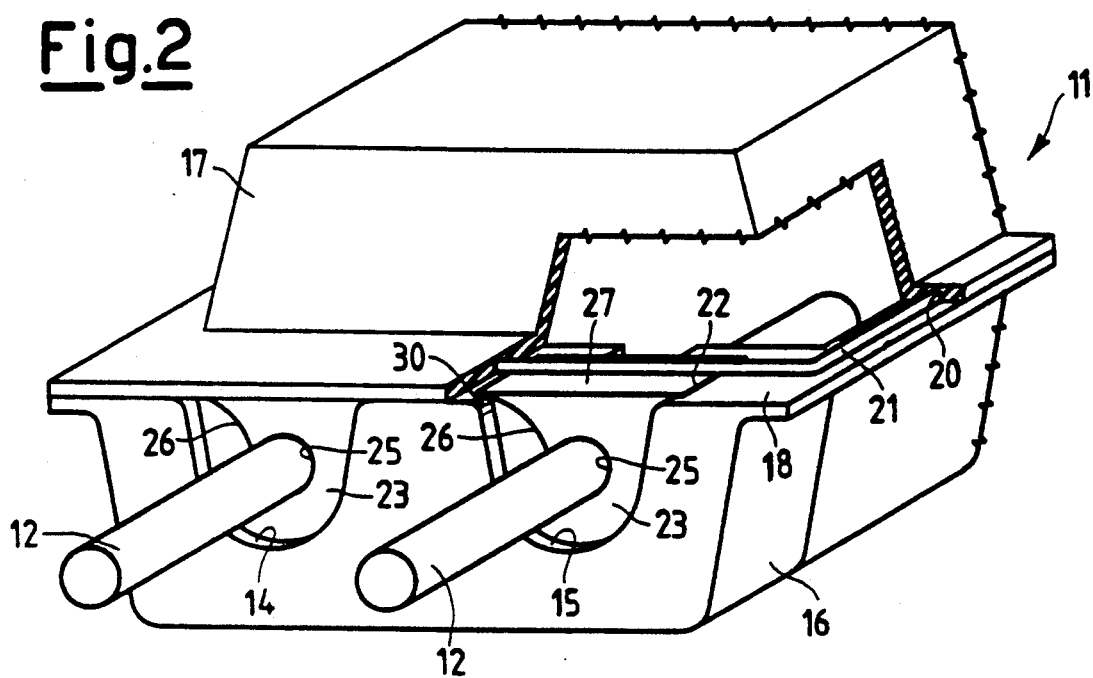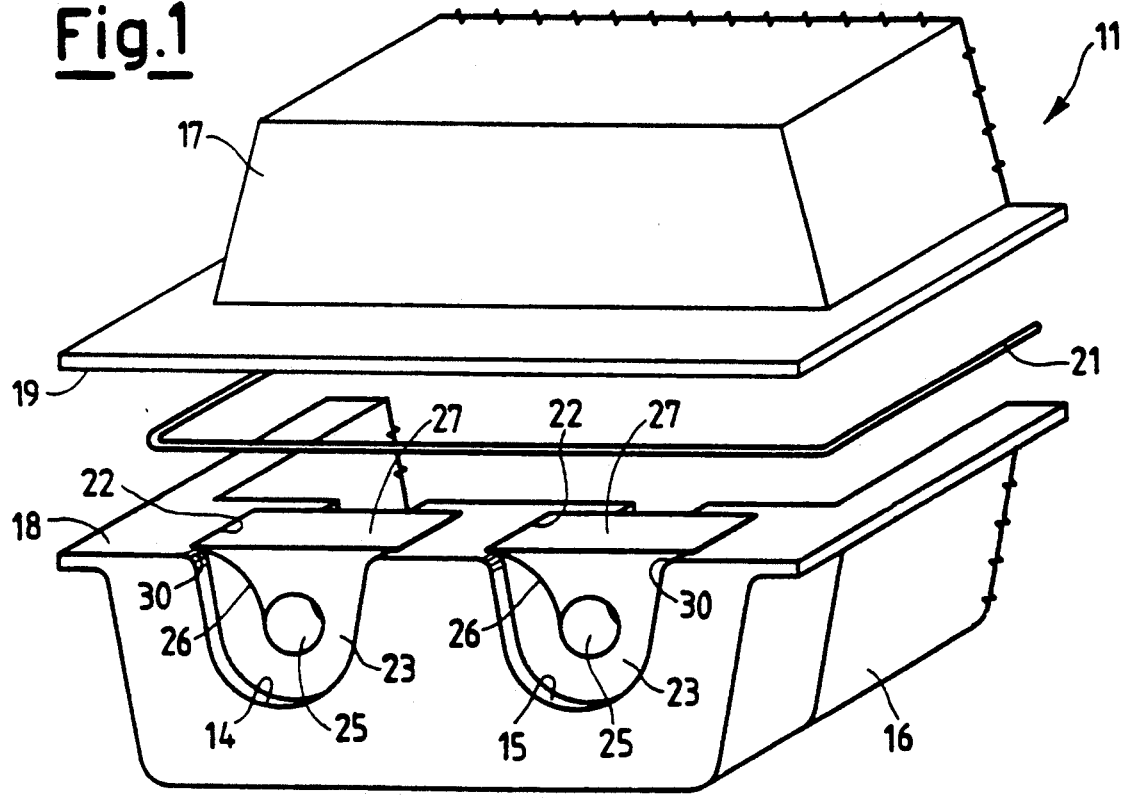

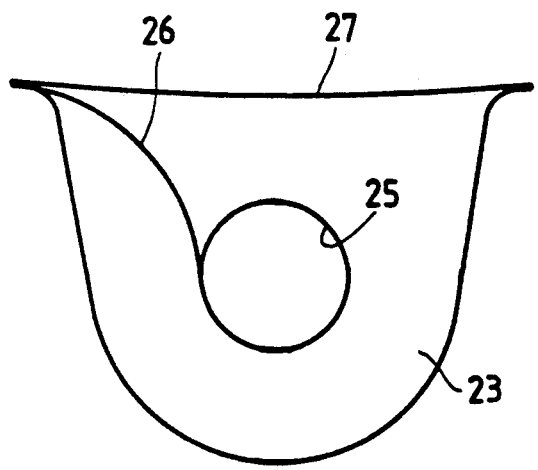
Fig.6
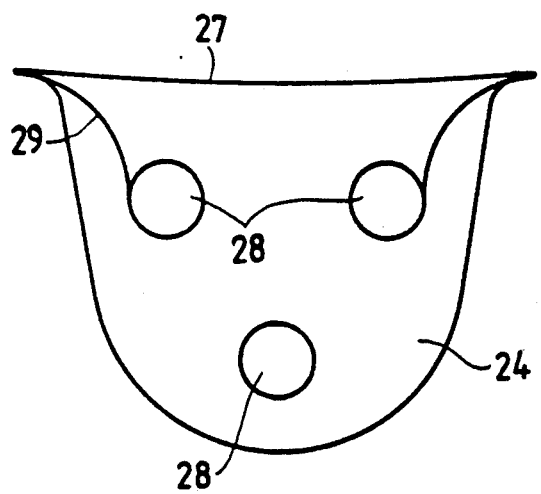
Fig.7
Fig.8
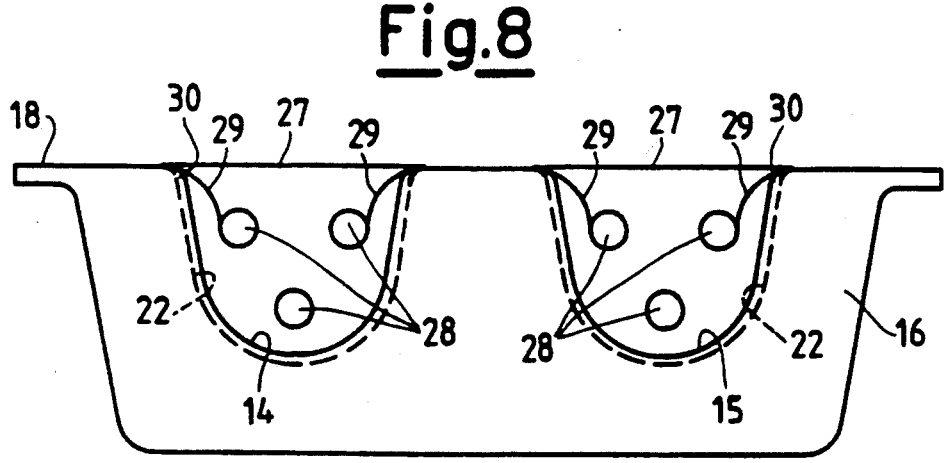

HERMETICALLY SEALED JOINT COVER FOR FIBRE OPTIC CABLES

BACKGROUND OF THE INVENTION

This invention relates to an hermetically sealed joint cover for fibre optic cables, comprising substantially a cable-joining box element and at least one entry aperture and one exit aperture for the cables, said cable entry and exit apertures being provided in a base connectable to a cover along respective connection surfaces to form said box element, within said apertures there being provided a seal gasket of elastic material provided with at least one through hole and deformable so as to fill the apertures as an interference fit when said cover is connected to said base.

The hermetical seal is a main feature for the correct operation of the above joint covers.

In known types of joint cover this seal is obtained using mastic spread along the connecting surfaces of the base and cable. However, with mastic the pressure under which the constituent elements of the joint cover are fitted together is decisive for proper sealing.

If the joint cover has to be reopened, the application of new mastic for resealing has to be preceded by the removal of all traces of mastic remaining on the connected parts. This requires time, and in addition the necessary sealing of the joint cover cannot be ensured.

Moreover in known joint covers it is difficult to insert more than one cable while maintaining the seal gaskets in place between the base and cover.

The object of the present invention is to obviate these drawbacks by means of a simple joint cover structure which is easy to assemble and install.

SUMMARY OF THE INVENTION

This object is attained by an hermetically sealed joint cover for fibre optic cables comprising substantially a cable-joining box element and at least one entry aperture and one exit aperture for the cables, said cable entry and exit apertures being provided in a base connectable to a cover along respective connection surfaces to form said box element, within said apertures there being provided a seal gasket of elastic material provided with at least one through hole and deformable so as to fill the apertures as an interference fit when said cover is connected to said base, characterised in that said through hole is partly open outwards to receive said cable to be joined, in said entry and exit apertures there being provided seats for receiving said seal gasket. In this manner the joint cover according to the present invention does not require mastic or similar sealants to achieve optimum hermetic sealing.

BRIEF DESCRIPTION OF THE DRAWINGS

FIG. 1 is a partial exploded perspective view of a joint cover according to the invention;

FIG. 2 is a partial perspective view of the joint cover of FIG. 1 assembled;

FIGS. 6 and 7 are front views of the gaskets of FIGS. 1, 2 and FIGS. 3, 4 respectively; and FIG. 8 is a front view of the base with gaskets for several cables.

DESCRIPTION OF THE PREFERRED EMBODIMENTS

Figure 4:
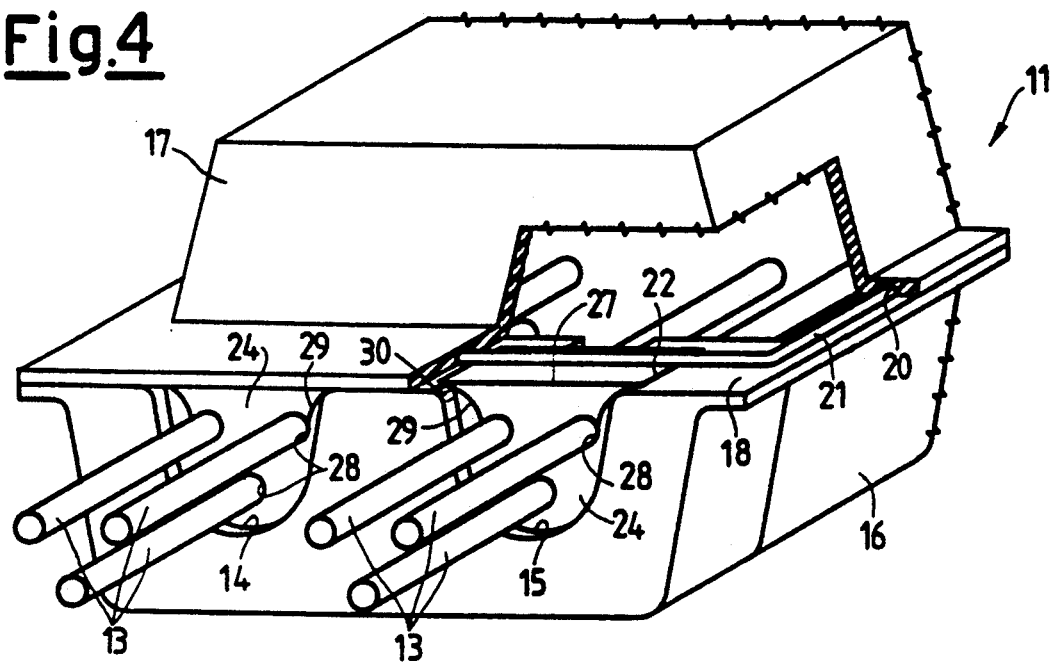
FIG. 4 is a partial perspective view of the joint cover of FIG. 3 assembled.

With reference to the figures, the joint cover according to the invention is of the hermetically sealed type for cables such as for telecommunications, and more particularly for fibre optic cables.

The joint cover 11 comprises substantially a box element for joining single cables 12 or multiple cables 13 in a cable entry aperture 14 and a cable exit aperture 15, and/or vice versa, formed in a base 16.

The cable-joining box element comprises a base 16 and a cover 17 which can be connected together along a first connection surface 18 and a second connection surface 19.

Both the first connection surface 18 and the second 19 are flat and superposable.

The second connection surface 19 comprises a seat 20 within which a seal gasket of O-ring type 21 is inserted.

In the base 16 there are also provided a pair of shaped seats 22 each containing a seal gasket 23 or 24.

Figure 5:
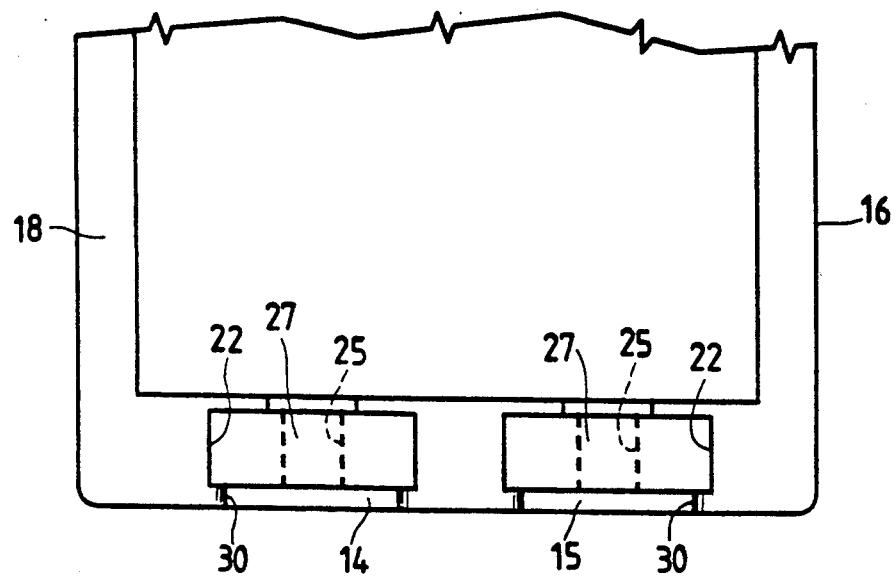
FIG. 5 is a plan view showing the positioning of the gaskets in the base.

The seal gasket 23 of FIGS. 1, 2, 5, 6 comprises an elastic material element with a through hole 25 which is partly open outwards by means of a longitudinal cut 26 to facilitate the insertion of the cable 12, and with an upper gap 27 formed in the material of the gasket and facing said second connection surface 19 of the cover 17.

The size of the gap 27 in the material depends on the diameter of the relative through hole 25 through which the cable 12 to be joined within the joint cover 11 passes.

When the hole 25 is engaged by the cable 12 the deformation undergone by the hole because of the interference is of an amount such as to nullify the gap 27 and make the connection surfaces of the base 18 and cover 19 also perfectly flat along the gasket 23 so as to be able to adhere one to the other with the necessary seal.

The sealing action is enhanced by the gasket of O-ring type 21, which is more rigid than the elastomeric material of the gasket 23 and presses into it when the base 16 is connected to the cover 17. The shaped seats 22 in the base for the seal gaskets 23 and 24 are of conjugate shape to said seal gaskets 23, 24 and are dimensioned such that the gaskets fit into them with slight interference.

The shaped seats 22 facilitate the insertion of the gasket into the base 16 and help the sealing action. This sealing is improved by the fact that as soon as the cover 17 is connected to the base 16, compression forces with a mainly radial component are developed to directly act on the sheath of cables.

The longitudinal cut 26 in the gasket 23 allows rapid positioning of the cable 12 in the through hole 25 and also improves this seal and the overall hermetic sealing of the joint cover according to the present invention.

Figure 3:
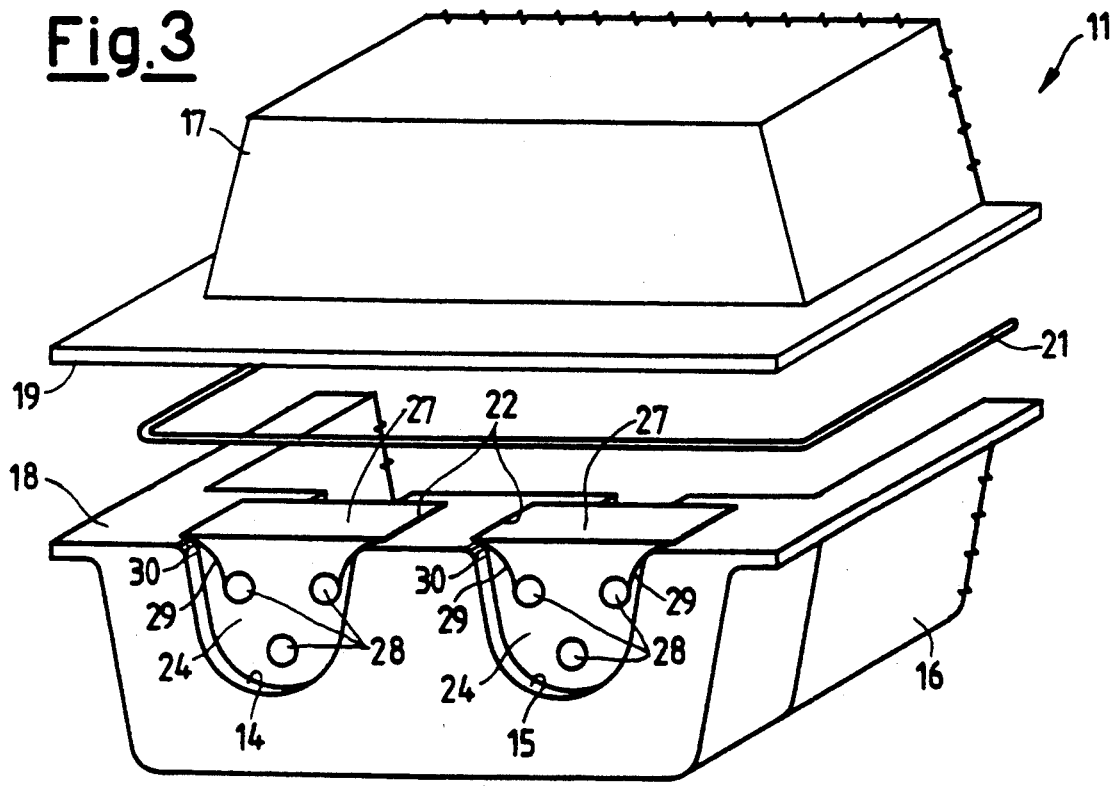
FIG. 3 is a partial exploded perspective view of a second embodiment with a different gasket.

FIGS. 3, 4, 7 and 8 show how a joint cover according to the invention also solves the positioning and joining problem for multiple cables 13.

For this purpose the seal gasket 24 comprises several through holes 28, at least two of which, namely the upper ones, comprise longitudinal cuts 29 for the insertion of the cables 13. The cut can be lacking in the lower hole 28, in which case the relative cable is the first to be inserted, this being done with minimum force.

It will be apparent that in both embodiments the number of apertures, holes, gaskets etc. can be changed without leaving the scope of the invention.

By virtue of the provision of U-shaped outer wall portions 30 and inner wall portions 31 (FIG. 5) the seats 22 assume a recessed shape which makes the position of the relative gasket 23, 24 more stable and improves its seal.

I claim:

1. An hermetically sealed joint cover for fibre optic cables comprising substantially a cable-joining box element and at least one entry aperture and at least one exit aperture for the cables, said entry and exit apertures being provided in a base having a first connection surface connectable to a cover having a second connection surface along said connection surfaces to form said box element, within said apertures there being provided a seal gasket of elastic material provided with at least one through hole and deformable so as to fill the apertures as an interference fit when said cover is connected to said base, characterized in that said through hole is partly open outwards to receiver said cable to be joined, in said entry and exit apertures there being provided seats for receiving said seal gasket.

2. A joint cover as claimed in claim 1, characterized in that the second connection surface is provided with a seat containing an elastic gasket of O-ring type.

3. A joint cover as claimed in claim 2, characterized in that the elastic material of the gasket of O-ring type is harder than the elastic material of the seal gasket.

4. A joint cover as claimed in claim 1, characterized in that said seal gasket comprises several holes, at least one being cut longitudinally to open them outwards and at least one being merely through holes.

5. A joint cover as claimed in claim 1, characterized in that said seats for receiving said seal gaskets are defined by U-shaped outer and inner wall portions.

* * * * *